United States Patent [19]
Karnish

[11] Patent Number: 5,507,451
[45] Date of Patent: Apr. 16, 1996

[54] SHUTTLE LAUNCH SYSTEM FOR MODEL ROCKET

[76] Inventor: Eugene Karnish, 2746 S. 9th. St., Omaha, Nebr. 68107

[21] Appl. No.: 319,015

[22] Filed: Oct. 6, 1994

[51] Int. Cl.$^6$ ............................ B64C 37/02; A63H 27/26
[52] U.S. Cl. .............................. 244/2; 244/63; 244/172; 102/348; 102/378; 102/351; 446/52; 446/56; 446/63
[58] Field of Search .................. 244/2, 63, 158 R, 244/172; 446/52, 63, 56; 102/347, 348, 351, 379, 378; D12/319, 320, 333

[56] References Cited

U.S. PATENT DOCUMENTS

| | | | |
|---|---|---|---|
| 2,344,957 | 3/1944 | Anzalone | 446/52 |
| 3,452,471 | 7/1969 | Street | 446/63 |
| 3,650,214 | 3/1972 | Green | 102/49.4 |
| 3,719,145 | 3/1973 | Brown et al. | 102/34.4 |
| 3,888,178 | 6/1975 | Senoski | 446/63 |
| 3,942,441 | 3/1976 | Senoski | 102/34.1 |
| 4,356,662 | 11/1982 | Strasser et al. | 46/74 C |
| 4,802,639 | 2/1989 | Hardy et al. | 244/2 |
| 5,217,187 | 6/1993 | Criswell | 244/158 R |
| 5,218,165 | 6/1993 | Cornelius et al. | 102/378 |
| 5,231,928 | 8/1993 | Phillips et al. | 102/351 |
| 5,267,885 | 12/1993 | Niskern et al. | 446/88 |

FOREIGN PATENT DOCUMENTS

| | | | |
|---|---|---|---|
| 3740645 | 6/1989 | Germany | 244/2 |

OTHER PUBLICATIONS

1992 Quest Model Rocket Catalog—AURORA.
Estes New Products: TAKEOFF IN 1994.

*Primary Examiner*—Galen L. Barefoot
*Attorney, Agent, or Firm*—Law Offices of John A. Beehner

[57] ABSTRACT

A shuttle launch system for a model rocket which includes a model rocket engine having a propellant charge for propelling the model rocket in a first direction and an ejection charge for ejecting matter in a second direction generally opposite the first direction consists of a booster rocket having a longitudinally extended tube with a peripheral sidewall, an inner chamber and top and bottom ends and an engine-receiving chamber adjacent the bottom end of the tube. A shuttle glider support structure is mounted on the booster rocket for releasably supporting a shuttle glider thereon. A fluid passage extends between the inner chamber of the booster rocket and the shuttle glider support structure such that a portion of gas within the inner chamber is redirected from the inner chamber through the fluid passage and out of the shuttle glider support structure. The shuttle launch system further includes a shuttle glider having a fuselage and at least one wing, the shuttle glider removably mounted on the shuttle glider support structure on the booster rocket. Finally, the shuttle glider is separated from the booster rocket upon ejection of matter from the ejection charge of a model rocket engine held within the engine receiving chamber, the ejected matter compressing gas within the inner chamber, a portion of that gas being redirected from the inner chamber through the fluid passage and outward from the shuttle glider support structure thereby propelling the shuttle glider outward from the booster rocket.

13 Claims, 8 Drawing Sheets

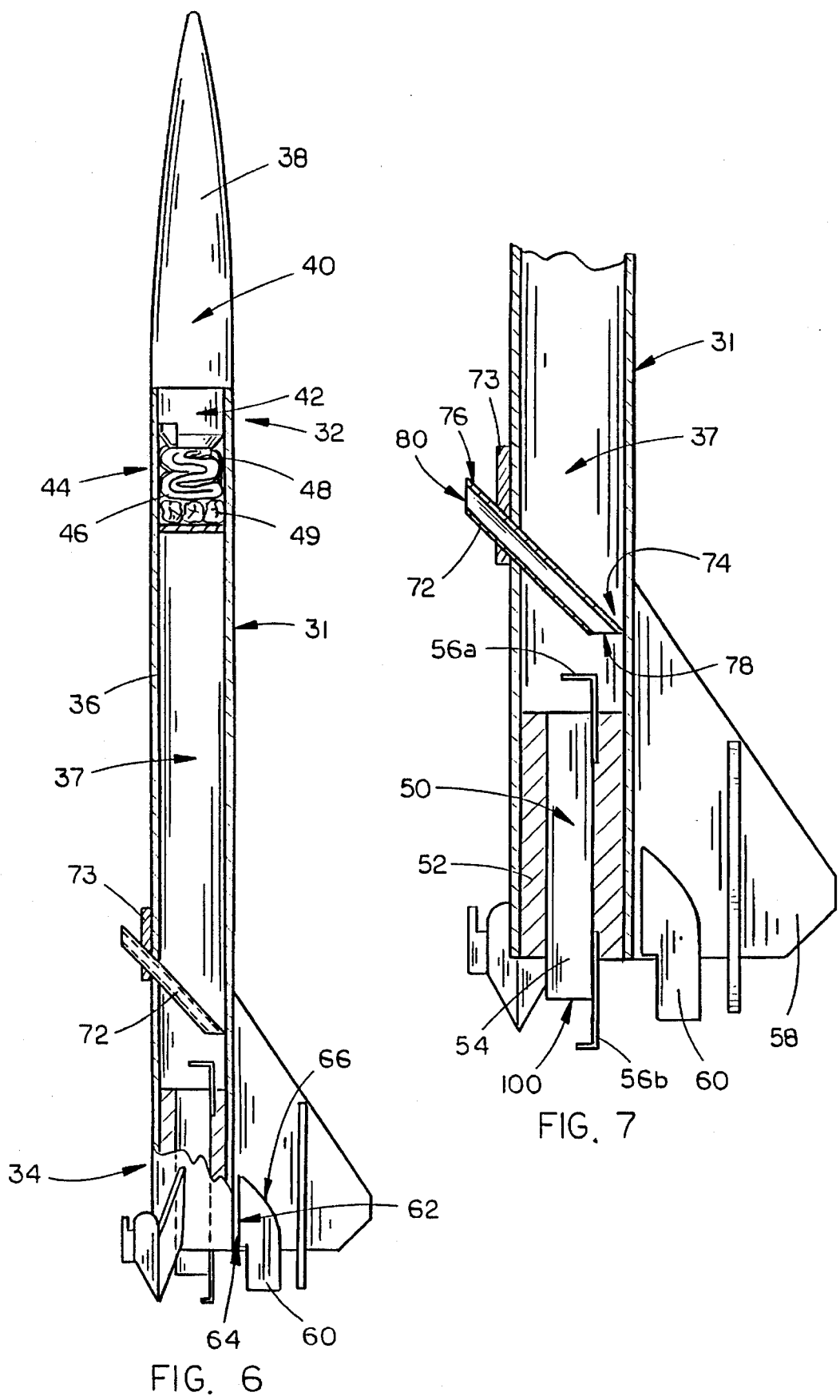

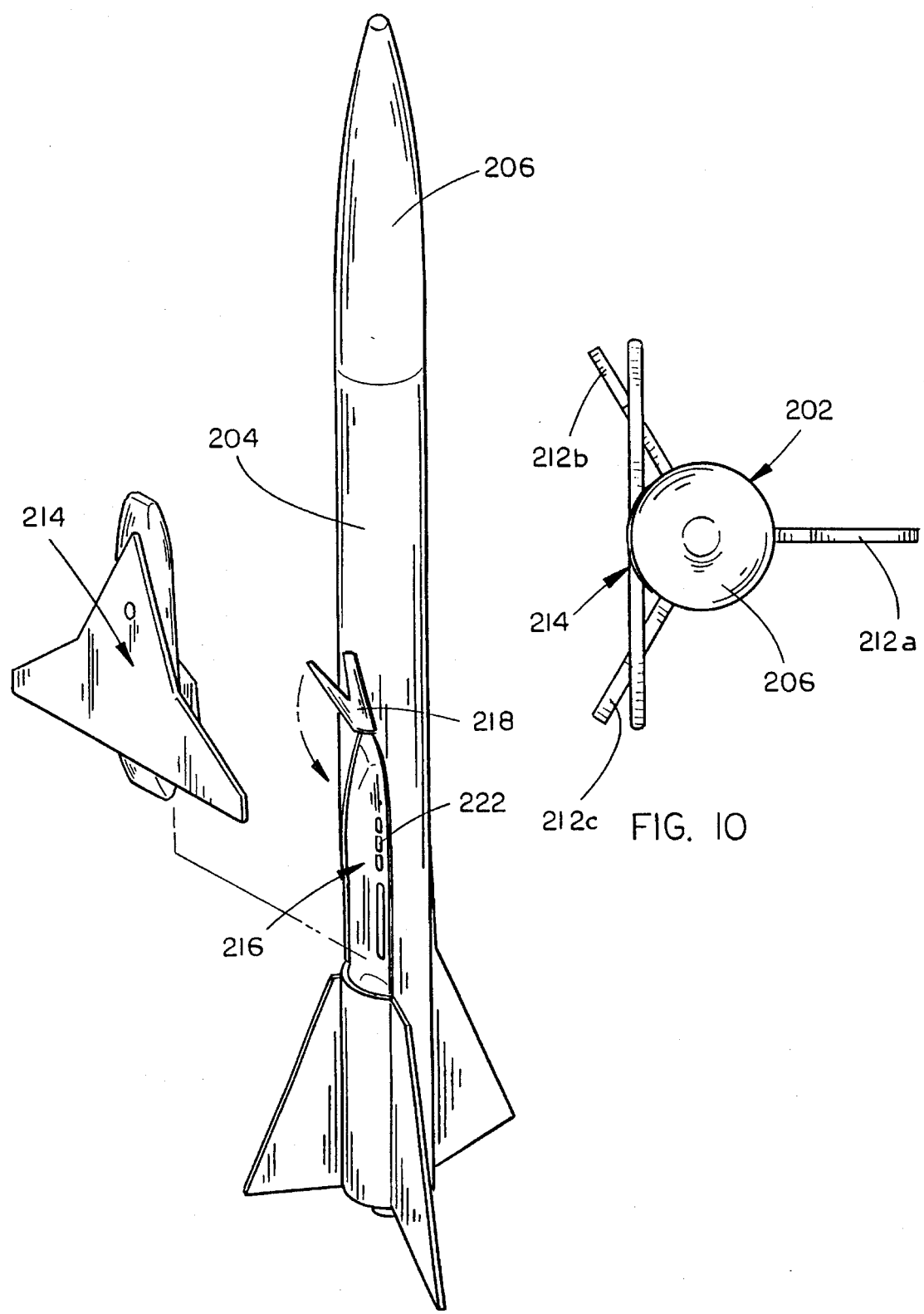

SHUTTLE LAUNCH SYSTEM FOR MODEL ROCKET

BACKGROUND OF THE INVENTION

1. Technical Field

This invention relates to model rocket systems and, more particularly, to a shuttle launch system for a model rocket which includes a booster rocket and shuttle glider, the shuttle glider removably mounted on the booster rocket and being ejected from the booster rocket in response to ignition of the ejection charge of a standard model rocket engine.

2. Description of the Prior Art

Model rocketry has long been a favorite hobby of both children and adults, dating from before the time of the first Mercury manned space flight mission. One of the appeals of the hobby of model rocketry that the hobbyist may construct replicas of existing space and military rockets in addition to designing his or her own concept rockets. A standard model rocket would include the following features: a generally cylindrical rocket body, a conical nose cone mounted at the top end of the rocket body, a plurality of stabilizer fins mounted on the bottom part of the rocket body, a model rocket engine and a recovery device such as a parachute or streamer. The rocket body, nose and fins may be decorated in various ways to replicate actual rockets, such as the Saturn V or the Phoenix air-to-air missile.

Recently, the most recognizable rocketry device has become the Space Shuttle. Therefore there is increased interest in constructing model rockets which include both a booster rocket and a shuttle, the shuttle capable of disengaging from the booster rocket at a point during the flight of the rocket and gliding back to the ground. Two examples of such shuttle models are the Space Shuttle manufactured by Estes Industries of Colorado and the Aurora manufactured by Hobbico Incorporated of Illinois. Without exception, the shuttles of these rockets are connected to the booster rocket by a clip or a pin which is mounted on the booster rocket which fits into a tube mounted on the shuttle. The shuttle is released from the booster rocket by the braking action of the booster rocket upon ignition of the ejection charge in the model rocket engine. The inertia of the shuttle glider causes the shuttle glider to disengage from the clip and glide down to the ground. No force other than the inertia of the shuttle glider acts to remove the shuttle glider from the booster rocket.

While such a system may be satisfactory in some circumstances, oftentimes the shuttle glider will incorrectly or improperly disengage from the booster rocket, resulting in the shuttle glider not being cleanly released to glide return to the ground. Additionally, if the shuttle glider does not properly disengage from the booster rocket, the booster rocket recovery system, most commonly a parachute, may be prevented from functioning correctly. In this situation, the combination of the shuttle glider and booster rocket would tumble downwards until contacting the ground, resulting in destruction of the model rocket. There is therefore a need for a shuttle launch system for a model rocket which will separate the shuttle glider from the booster rocket by positive application of force as opposed to reliance on inertia of the shuttle glider.

Presently, the actual Space Shuttle is detached from the large cylindrical auxiliary fuel tank by small explosive bolts which serve to force the shuttle and fuel tank apart from one another. The distance thus formed between the shuttle and the auxiliary fuel tank acts to prevent mishaps which might be caused by contact between the shuttle and the fuel tank. At present, no model rocket design includes such a means for separating the shuttle and the rocket. Therefore, to more accurately model the Space Shuttle, there is a need for a shuttle launch system for model rocketry which will forcibly separate the shuttle glider from the booster rocket.

Therefore, an object of the present invention is to provide an improved shuttle launch system for model rockets.

Another object of the present invention is to provide a shuttle launch system for a model rocket which includes a booster rocket and a shuttle glider, the shuttle glider removably mounted on the booster rocket such that the shuttle glider may release from the booster rocket and glide return to the ground.

Another object of the present invention is to provide a shuttle launch system for a model rocket in which the shuttle glider is connected to the booster rocket by a lug tube which extends into the body of the booster rocket such that upon the ejection charge of a model rocket engine igniting, gas discharge is directed through the lug tube to contact the shuttle glider thus forcing the shuttle glider away from the booster rocket.

Another object of the present invention is to provide a shuttle launch system for a model rocket which is designed to generally resemble full-scale rockets presently used in space flight.

Finally, an object of the present invention is to provide a shuttle launch system for a model rocket which is of sturdy construction and is relatively simple and safe in use.

SUMMARY OF THE INVENTION

The present invention provides a shuttle launch system for a model rocket which includes a model rocket engine having a propellant charge for propelling the model rocket in a first direction and an ejection charge for ejecting matter in a second direction generally opposite the first direction. The system includes a booster rocket having a longitudinally extended tube with a peripheral side wall, an inner chamber and top and bottom ends and an engine receiving chamber adjacent the bottom end of the tube. A shuttle glider support structure is mounted on the booster rocket, the support structure operative to releasably support a shuttle glider thereon. A fluid passage extends between the inner chamber of the booster rocket and the shuttle glider support structure such that a portion of gas compressed by the ejection charge of the model rocket is redirected from the inner chamber through the fluid passage and out of the shuttle glider support structure. The shuttle launch system further includes a shuttle glider having a fuselage and at least one wing. The shuttle glider is removably mounted on the shuttle glider support structure on the booster rocket. The shuttle glider is then separated from the booster rocket upon ejection of matter from the ejection charge of the model rocket engine held within the engine receiving chamber, the ejected matter compressing fluid within the inner chamber, a portion of compressed fluid being redirected from the inner chamber through the fluid passage and outward from the shuttle glider support structure thereby propelling the shuttle glider outward from the booster rocket.

The present invention also provides a method of launching a shuttle glider from a model rocket which includes providing the booster rocket, model rocket engine, shuttle glider support structure, fluid passage and shuttle glider described above and removably mounting the shuttle glider on the shuttle glider support structure. The propellant of the model rocket engine is ignited thus launching the booster rocket and shuttle glider into the atmosphere. Following flame-out of the propellant charge, the ejection charge is ignited thereby ejecting matter upwards through the inner chamber of the booster rocket compressing gas within the inner chamber. The shuttle glider is ejected from the booster rocket in response to the compressed gas within the inner chamber being redirected through the fluid passage out of the shuttle glider support structure. In this manner, the shuttle glider is ejected from the booster rocket.

As can readily be seen from the above description, the shuttle launch system of the present invention provides a substantial improvement over those shuttle systems found in the prior art. For example, the redirection of compressed gas through the fluid passage acts to force the shuttle glider away from the booster rocket. This acts to prevent the shuttle glider from becoming entangled with the booster rocket, as the shuttle glider is commonly thrust 3–5 feet from the booster rocket. Additionally, the forced separation of the shuttle glider from the booster rocket more accurately models the actual operation of the Space Shuttle which uses explosive bolts to separate the large auxiliary fuel tank from the space shuttle itself. As accuracy in modeling is a goal of model rocketry, it is seen that the present invention provides a substantial improvement in both function and design over those devices found in the prior art.

BRIEF DESCRIPTION OF THE DRAWINGS

FIG. 6 is a side sectional elevational view of the booster rocket showing the internal structure of the booster rocket;

FIG. 7 is a partial detail sectional view of the lower half of the booster rocket exhibiting in more detail those features shown in FIG. 6;

FIG. 10 is a top plan view of the embodiment of FIG. 8;

FIG. 11 is a perspective view of the booster rocket of FIG. 8;

DESCRIPTION OF THE PREFERRED EMBODIMENT

Figure 1:
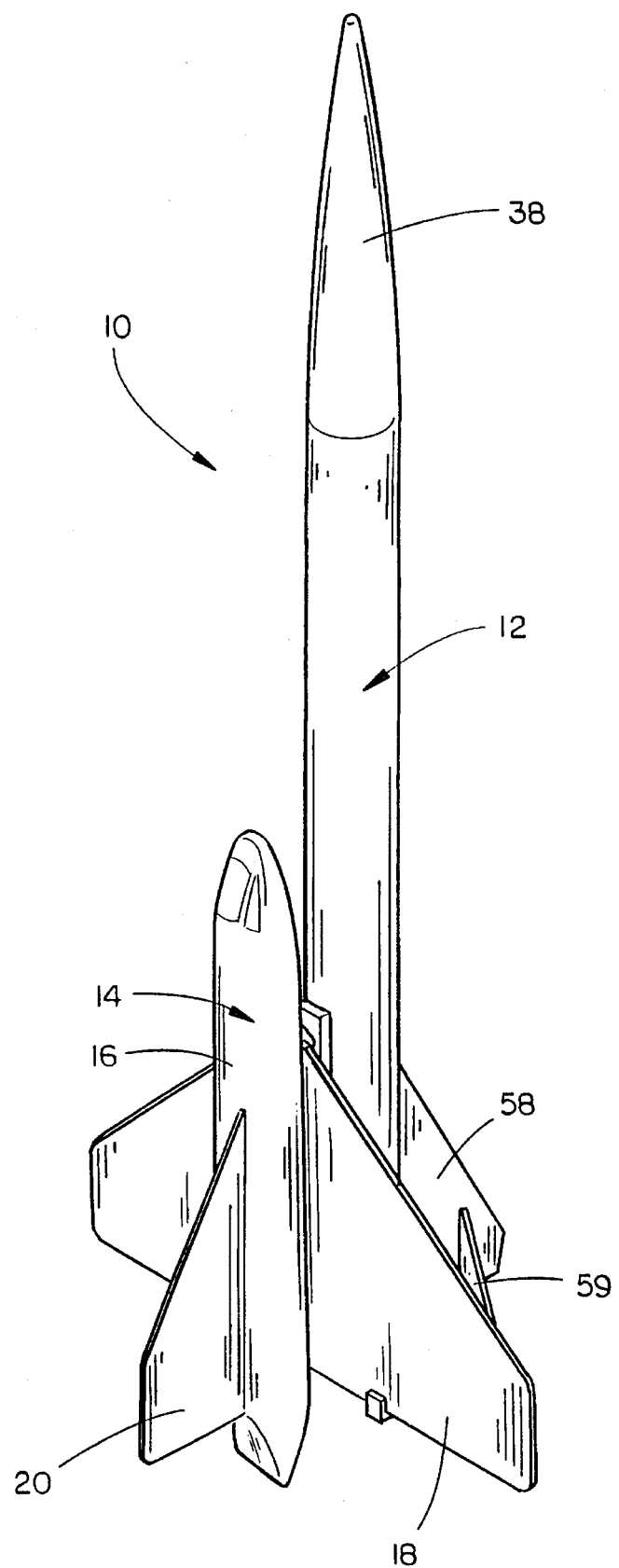
FIG. 1 is a perspective view of a first embodiment of the shuttle launch system of the present invention.

The shuttle launch system 10 is shown in a first preferred embodiment in FIGS. 1–7 as including a booster rocket 12 and a shuttle glider 14, the shuttle glider 14 removably mounted on the booster rocket 12.

The shuttle glider 14 is shown best in FIGS. 1–4 as including a fuselage 16 and a generally delta-shaped wing 18, the fuselage 16 mounted on the wing 18 at approximately the midpoint of the delta wing 18. It is preferred that the shuttle glider 14 be shaped to resemble in miniature the actual Space Shuttle presently being used by the United States of America in their manned space flight program. The shuttle glider also includes a vertical stabilizer fin 20 which is mounted on the rear of the fuselage 16. The stabilizer fin 20 acts to improve the flight characteristics of the glider 14.

An alternative embodiment of the shuttle glider 14 would replace the delta-shaped wing 18 with a pair of standard wings (not shown) extending outward from the fuselage 16, one on each side of the fuselage 16. The resulting shuttle glider 14 would thus most resemble a standard swept-wing aircraft, such as a commercial jet airliner.

It is preferred that the shuttle glider 14 be constructed of a wood having a low density such as balsa wood which will provide the shuttle glider 14 with a sufficient amount of structural strength yet will reduce the weight of the shuttle glider 14. The glide characteristics of the shuttle glider are thus improved while the amount of rocket thrust necessary to boost the shuttle glider 14 is reduced.

The fuselage 16 of the shuttle glider 14 further includes a lug tube receiving socket 22 formed in the base 24 of the fuselage 16. The lug tube receiving socket 22 is preferably a generally cylindrical well which extends upwards through the fuselage 16 and is angled such that the socket 22 is tilted forward towards the front of fuselage 16.

It is preferred that the shuttle glider 14 be approximately 5–10 inches in length, extend 5–10 inches wing tip to wing tip and be approximately 12 inches in height. Of course, these are only preferred dimensions which may vary considerably depending upon the scale of the shuttle launch system 10.

The booster rocket 12 is best shown in FIGS. 1–3 and 5–7 as including a longitudinally extended tube 30 which forms the body of the booster rocket 12. The tube 30 includes top and bottom ends 32 and 34 and a peripheral side wall 36 and is preferably formed of stiff cardboard or the like. It is preferred that the tube 30 be approximately two inches in diameter and approximately 18–30 inches in height.

Removably mounted at the top end 32 of the tube 30 is a nose cone 38 which preferably has a generally conic shape. It is preferred that nose cone 38 be formed of plastic and be generally hollow to reduce the weight of the nose cone 38. Nose cone 38 includes a generally conic upper section 40 and a generally cylindrical lower section 42, the upper section 40 having a maximum diameter approximately equal to the diameter of the tube 30 and the lower section 42 having an outer diameter approximately equal to the inner diameter of the tube 30, such that the lower section 42 may be slidably received within the top end 32 of the tube 30. Therefore, nose cone 38 may be separated from the tube 30.

It is preferred that the booster rocket 12 further include a recovery system 44 consisting of a parachute or streamer 46 connected to the nose cone 38 and tube 30 by a cord 48, shown best in FIG. 6. Protective wadding 49 is also included. It is preferred that the recovery system 44 function similarly to those commonly used in other model rockets, and is specifically designed for the purpose of allowing the booster rocket 12 to return to the ground intact.

Tube 30 further includes an engine receiving chamber 50 mounted in the bottom end of the tube 30, as shown best in FIGS. 6 and 7. The engine receiving chamber 50 preferably consists of a cylindrical cardboard tube 52 which decreases the inner diameter of the tube 30 to snugly accommodate a rocket engine 100. Lining the inner wall of the chamber tube 52 is a metallic engine holding tube 54 which is frictionally secured within the chamber tube 52. It is preferred that the engine holding tube 54 have an inner diameter slightly larger than the outer diameter of the model rocket engine 100 to be used in the shuttle launch system 10. In this manner, the model rocket engine 100 may be slidably inserted into the engine holding tube 54 and removed therefrom following launching of the shuttle launch system 10.

Finally, to secure the model rocket engine 100 within the engine holding tube 54, a pair of L-shaped securement brackets 56a and 56b are provided, one mounted at each end of the engine holding tube 54 and preferably constructed of a hard metal such as steel. The L-shaped securement brackets 56a and 56b prevent the model rocket engine 100 from moving vertically within the engine holding tube 54, but, in the case of the lowermost L-shaped securement bracket 56b, the distance between the end of the securement bracket 56b and the bottom of the engine holding tube 54 is sufficient to allow removal of the model rocket engine 100 when the model rocket engine 100 is removed at an angle from the center longitudinal axis of the engine holding tube 54. Therefore, the model rocket engine 100 may be removably secured within the booster rocket 12.

Figure 2:
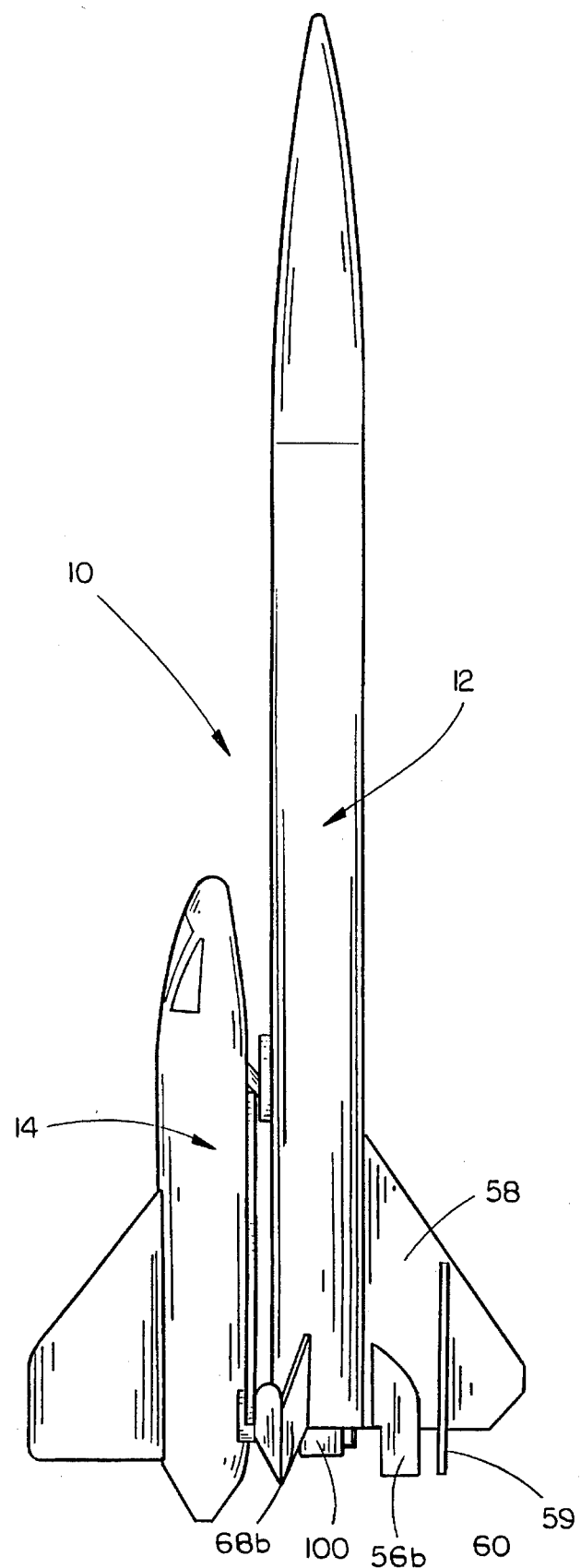
FIG. 2 is a side elevational view of the embodiment of FIG. 1.
Figure 4:
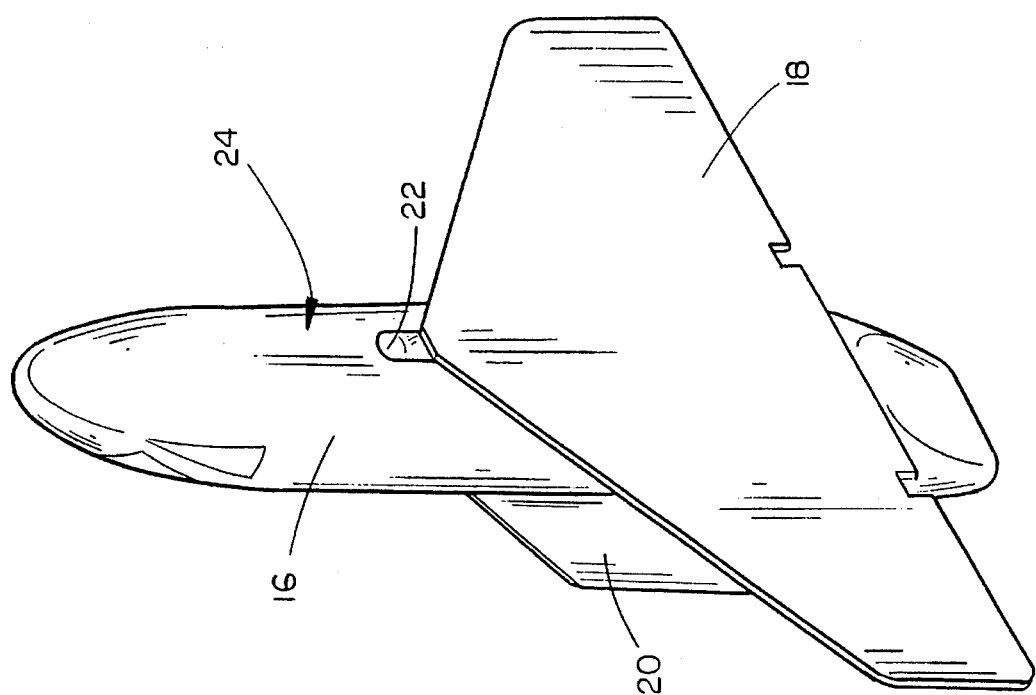
FIG. 4 is a perspective view of the shuttle glider.

Mounted on the outer surface 31 of the longitudinally extended tube 30 is a generally triangular stabilizer fin 58 which is mounted such that the fin 58 is aligned with the center longitudinal axis of the longitudinally extended tube 30. It is preferred that the stabilizer fin 58 be constructed of either plastic or balsa wood and be secured to the tube 30 by glue or the like. As is best seen in FIGS. 1 and 2, the stabilizer fin 58 is of larger than normal size to provide a counter balance to the weight of the shuttle glider 14 which will be mounted on the opposite side of the longitudinally extended tube 30. While the stabilizer fin 58 is shown in a preferred shape, it is to be understood that the precise shape of the stabilizer fin 58 is not critical to the proper functioning of the present invention, but instead it is the size and weight of the fin 58 which is critical. Of course, the fin should be aerodynamic as well to lower the coefficient of drag for the booster rocket 12. Additionally, the fin 58 may include a stabilizer wing 59 best shown in FIGS. 3 and 5.

Mounted at the base of fin 58 is a shaped counterbalance weight 60, shown best in FIGS. 6 and 7, which has a cross sectional shape similar to the shape of the state of Nebraska. It is important that the weight 60 be positioned as shown in FIGS. 6 and 7, specifically such that the flat inner side 62 of weight 60 is spaced slightly from the tube 30 thereby forming a channel 64. This channel 64 combined with the curved outer side 66 of weight 60 results in air passing over the weight 60 generating lift in a direction perpendicularly outward from the center longitudinal axis of the tube 30. The weight 60 thus acts much like a wing. The lift produced by the weight 60 is necessary to counterbalance the lift produced by the delta-shaped wing 18 of the shuttle glider 14 when the shuttle glider 14 is placed on the booster rocket 12. Therefore, it is seen that the stabilizer fin 58 and shaped counterbalance weight 60 cooperate to negate the lift and weight of the shuttle glider 14, thus allowing the booster rocket 12 to launch correctly.

Figure 5:
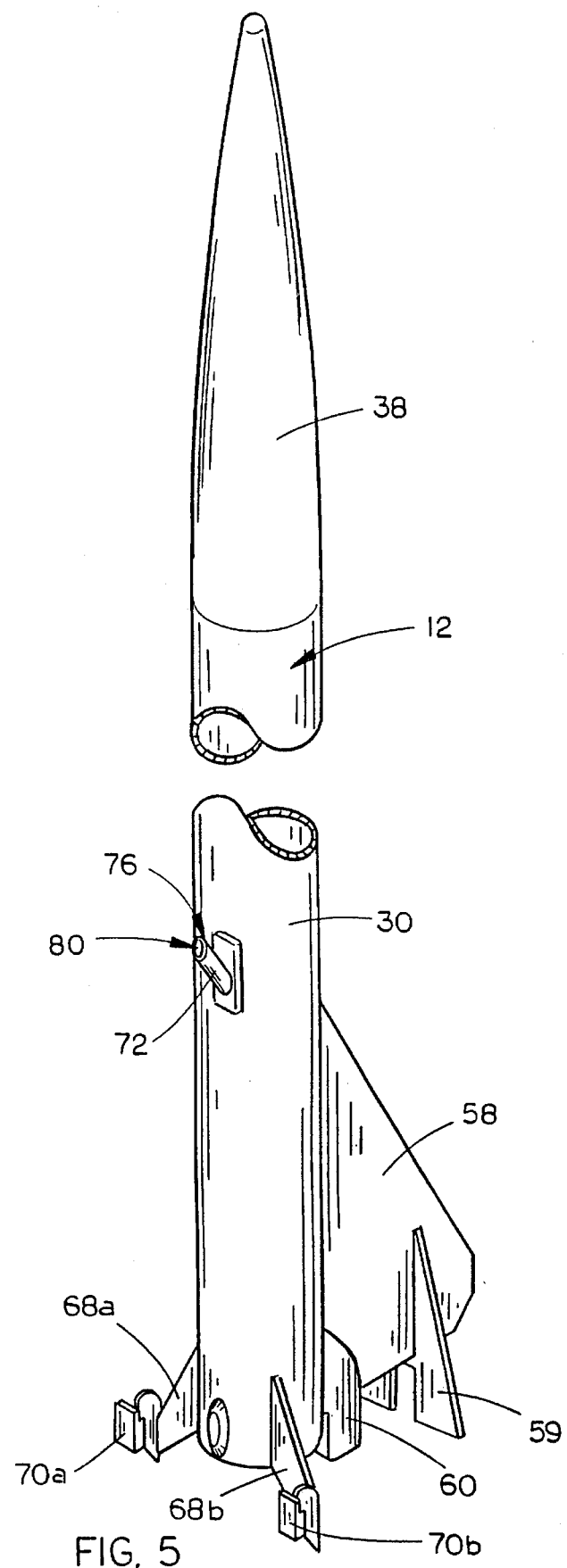
FIG. 5 is a perspective view of the booster rocket.

As best seen in FIGS. 5–7, the booster rocket 12 further includes a pair of shuttle support struts 68a and 68b mounted on the outer surface 31 of the tube 30 towards the bottom end 34 of tube 30. The shuttle support strut 68a and 68b each further include a securement hook 70a and 70b mounted on the end of each strut 68a and 68b, as shown in FIG. 7. The shuttle support struts 68a and 68b are mounted on the tube 30 such that the securement hooks 70a and 70b are generally parallel with each other and positioned on opposite sides of the longitudinally extended tube 30. It is also preferred that the securement hooks 70a and 70b be positioned such that were a line to be drawn between the hooks 70a and 70b, the line would pass just above the outer surface 31 of tube 30 at its point of closest approach. This arrangement allows the securement hooks 70a and 70b to engage the delta-shaped wing 18 at two places thereon, those places being on either side of the fuselage 16. It is preferred that the securement hooks 70a and 70b loosely secure the shuttle glider 14 to prevent accidental dislodging of the shuttle glider 14 but not prevent intentional dislodging of the shuttle glider 14, as will be explained below.

The shuttle support struts 68a and 68b only provide two points of securement for the shuttle glider 14. The third point of securement for the shuttle glider 14 is provided by a shuttle lug tube 72, shown best in FIGS. 6 and 7. The longitudinally extended tube 30 is seen to further include an inner chamber 37 which extends from the engine receiving chamber 50 upwards to the nose cone 38. It is through this inner chamber 37 that gases are forced by the ejection charge of the model rocket engine 100 when the ejection charge is ignited. In ordinary model rockets, the ejection charge of the model rocket engine 100 forces the nose cone 38 off of the tube 30 thus releasing the recovery system 44 to gently return the rocket to the ground. The present invention functions in a similar way, with one notable exception.

It is preferred that the shuttle lug tube 72 extends through the peripheral side wall 36 of the tube 30 and into the inner chamber 37. A reinforcement panel 73 may be provided on the outer surface 31 of rocket 12 adjacent the shuttle lug tube 72 to strengthen the peripheral sidewall 36. The shuttle lug tube 72 includes an inner end 74 positioned within the inner chamber 37 and an outer end 76 which extends above the outer surface 31 of the tube 30. It is preferred that the shuttle lug tube 72 be constructed of a relatively sturdy plastic and have a diameter of approximately ⅛ to ½ of an inch.

The inner end 74 of the shuttle lug tube 72 further includes a gas-receiving opening 78 which is preferably angled perpendicular to the center longitudinal axis of the tube 30. In this manner, gas compressed within the inner chamber 37 by the ignition of the ejection charge of the model rocket engine 100 is directed through the gas-receiving opening and into the shuttle lug tube 72. Pressurized gas travels through the shuttle lug tube 72 towards the outer end 76 of the tube 72. At the outer end 76 of the shuttle lug tube 72, a gas-releasing opening 80 is provided, through which gas may be ejected. Therefore, gas passing through the inner chamber 37 of the longitudinally extended tube 30 is redirected through the gas-receiving opening 78 of the shuttle lug tube through the shuttle lug tube 72 and out of the gas-releasing opening 80 in the outer end 76 of shuttle lug tube 72.

Figure 3:
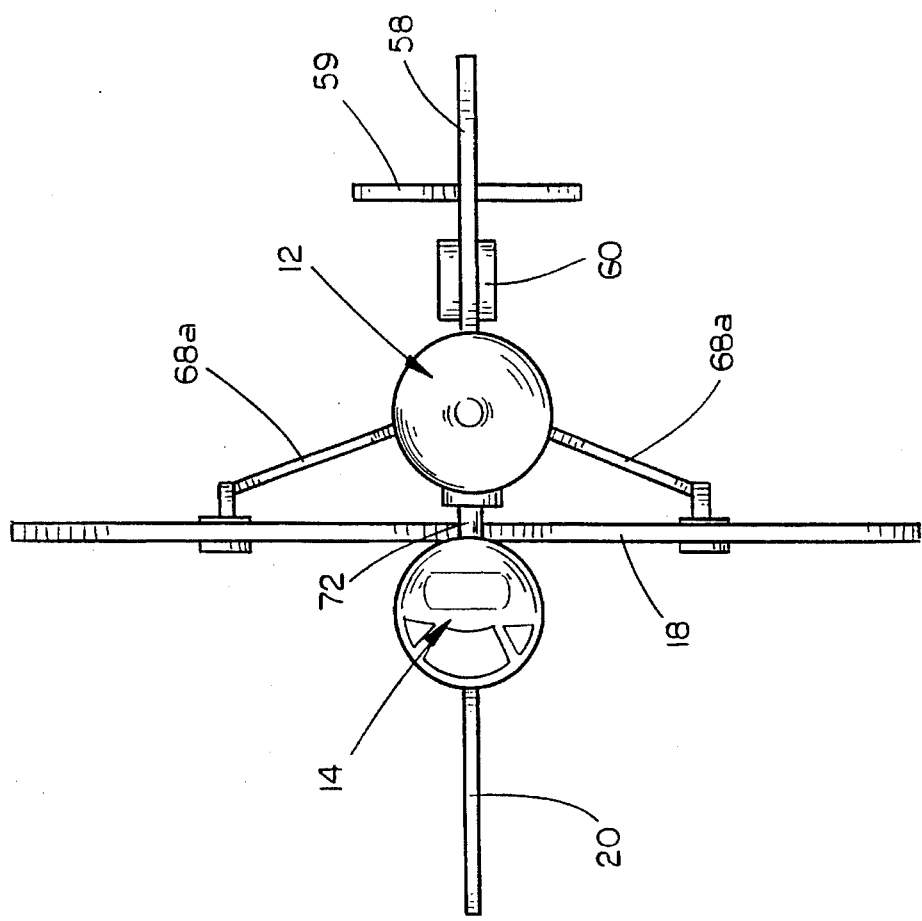
FIG. 3 is a top plan view of the shuttle glider mounted on the booster rocket.

FIGS. 1–3 best show how the shuttle glider 14 is releasably mounted on the booster rocket 12. Lug receiving socket 22 is positioned such that the shuttle lug tube 72 may be slid into the socket 22. Simultaneously, the delta-shaped wing 18 of the shuttle glider 14 is positioned within the securement hooks 70a and 70b of shuttle support struts 68a and 68b. The three point connection which results from the shuttle lug tube 72 and shuttle support struts 68a and 68b thus prevents the shuttle glider 14 from accidentally disengaging from the booster rocket 12 prior to the time of ignition of the ejection charge in the model rocket engine 100.

The shuttle glider 14 is ejected from booster rocket 12 in the following manner: the booster rocket 12 and shuttle glider 14 are thrust into the air by ignition of the model rocket engine 100. Following flame out of the model rocket engine 100, the booster rocket 12 and shuttle glider 14 coast until the ejection charge in the model rocket engine is ignited. Upon ignition of the ejection charge, gas within the inner chamber 37 of tube 30 is compressed, forcing the nose cone 38 away from the longitudinally extended tube 30 and releasing the recovery system 44. A portion of the compressed gas is directed through the shuttle lug tube 72 by gas-receiving opening 78, the compressed gas being ejected from gas-releasing opening 80. The compressed gas contacts the lug tube receiving socket 22 within shuttle glider 14 thus forcing the socket 22 off of the outer end 76 of shuttle lug tube 72 and thus forcing shuttle glider 14 outward and upwards away from the booster rocket 12. In experimental trials, it has been found that the distance the shuttle glider 14 is forced away from the booster rocket 12 can be as great as five feet from the impulse provided from ignition of the ejection charge. At this point, the shuttle glider 14 is free to glide return to the ground whereas the booster rocket 12 returns to the ground via the recovery system 44.

An alternative embodiment of the present invention is shown in FIGS. 8–13 as including many of the features of the first embodiment described above. However, certain significant differences exist between the two embodiments.

The shuttle launch system 200 of the embodiment of FIGS. 8–13 includes a booster rocket 202 having a longitudinally extended tube 204, a nose cone 206, recovery system 208, engine-receiving chamber 210 and stabilizer fins 212a–c. It is also preferred that the shuttle glider 214, although preferably smaller than the shuttle glider 14 shown in the first embodiment, be substantially similar thereto.

Figure 8:
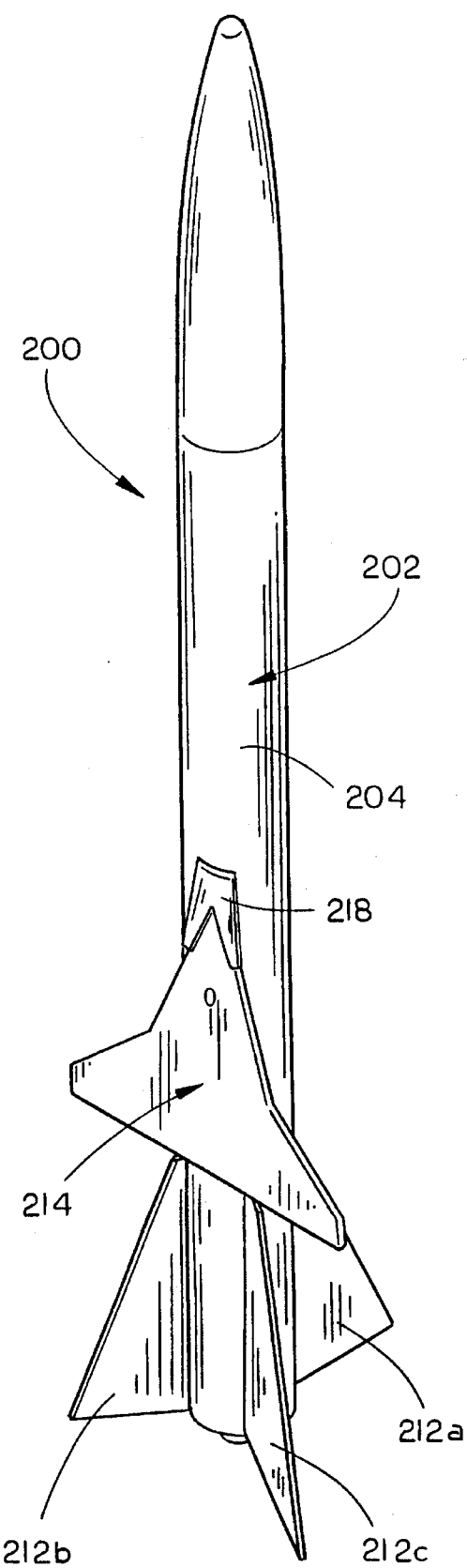
FIG. 8 is a perspective view of a second embodiment of the shuttle launch system of the present invention.
Figure 9:
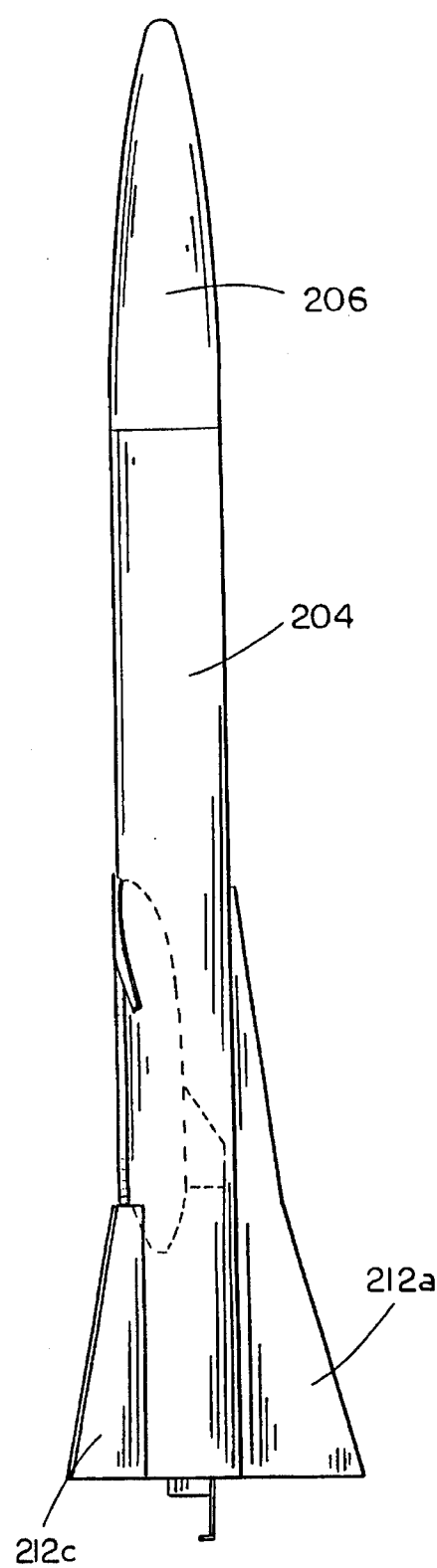
FIG. 9 is a side elevational view of the embodiment of FIG. 8.

The second embodiment, however, replaces the securement system of the first embodiment with a completely different system. Specifically, longitudinally extended tube 204 further includes a shuttle-receiving depression 216 formed just above the engine-receiving chamber 210, as shown best in FIGS. 12 and 13. As shown best in FIGS. 8–10, the shuttle glider 214 nestles within the shuttle-receiving depression 216 and is releasably secured therein by a nose flap 218 mounted on the outer surface of tube 204 directly above the shuttle-receiving depression 216 and extending partially over the depression 216. As is best seen in FIGS. 8–10, the delta-shaped wing 215 of shuttle glider 214 cooperates with the stabilizer fins 22a–c of booster rocket 202 to form a generally stable three-fin combination. The aerodynamic characteristics of the booster rocket 202 are thus preserved.

Figures 12, 13:
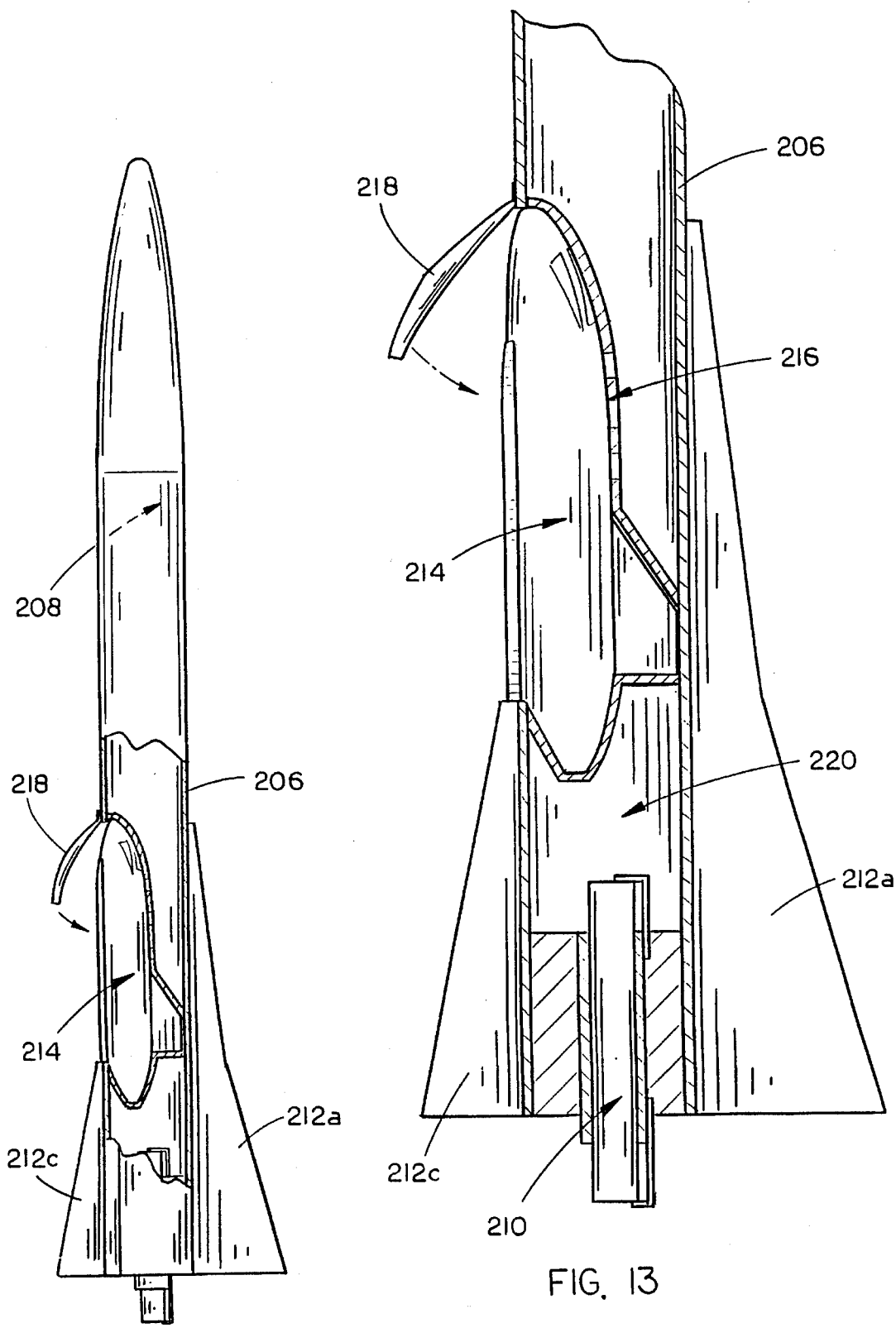
FIG. 12 is a side sectional elevational view of the booster rocket of FIG. 8.
FIG. 13 is a partial detail side sectional elevational view of the booster rocket of FIG. 8.

As best shown in FIGS. 12 and 13, the inner chamber 220 of tube 204 again extends the length of the tube 204. However, towards the lower end of the tube 204 but above the engine-receiving chamber 210, the inner chamber 220 is constricted due to the shuttle-receiving depression 216. At this point, a plurality of small gas-releasing holes 222 are formed extending between the shuttle-receiving depression 216 and inner chamber 220. Upon ignition of the ejection charge on the model rocket engine 100, gas within the inner chamber 220 is compressed, and a portion of that gas is directed through the gas-releasing holes 222 and contacts the shuttle glider 214. The nose flap 218 is constructed in such a way that outward movement of the shuttle glider 214 in response to the gas pressure is permitted, and thus the shuttle glider 214 is forced away from the booster rocket 202, in much the same fashion as was described in connection with the first embodiment. The presently described second embodiment thus displays an alternative shuttle launch system 200.

While the present invention has been described with some degree of particularly, it is to be understood that many changes and modifications may be made to the embodiments described herein which still fall within the intended broad scope of the claims. For example, the dimensions and overall shapes of the booster rocket and shuttle glider may be modified depending upon the builder's desires. Alternatively, a different method of redirecting the compressed gas within the inner chamber may be used, so long as the shuttle glider is forcibly ejected from the booster rocket, not merely ejected in response to slowing down of the booster rocket. There has thus been set forth and described a shuttle launch system which accomplishes at least all of the stated objectives.

I claim:

1. A shuttle launch system for a model rocket including a model rocket engine having a propellant means for propelling said model rocket in a first direction and ejection means for ejecting matter in a second direction generally opposite said first direction, said system comprising;

a booster rocket including a longitudinally extended tube having a peripheral sidewall, an inner chamber, an outer surface and top and bottom ends and an engine receiving chamber adjacent said bottom end of said tube;

shuttle glider support means mounted on said booster rocket for releasably supporting a shuttle glider thereon;

fluid passage means extending between said inner chamber of said booster rocket and said outer surface adjacent said shuttle glider support means such that a portion of fluid compressed within said inner chamber in response to ignition of an ejection means of a model rocket is redirected from said inner chamber through said fluid passage means and out of said booster rocket;

a shuttle glider including a fuselage and at least one wing;

said shuttle glider removably mounted on said shuttle glider support means on said booster rocket; and said shuttle glider being separated from said booster rocket upon ejection of matter from the ejection means of a model rocket engine held within said engine receiving chamber thereby compressing fluid within said inner chamber and redirecting a portion of said compressed fluid through said fluid passage means and outward from said booster rocket adjacent said shuttle glider support means such that said portion of compressed fluid provides impulse to propel said shuttle glider outward from said booster rocket.

2. The shuttle launch system of claim 1 wherein said fluid passage means extends between said inner chamber of said booster rocket and said shuttle glider support means.

3. The shuttle launch system of claim 1 wherein said booster rocket further comprises a generally vertical stabilizer fin mounted on said longitudinally extended tube of said booster rocket opposite said shuttle glider support means such that said shuttle glider is mounted opposite said stabilizer fin.

4. The shuttle launch system of claim 3 wherein said stabilizer fin further comprises a shaped counterbalance weight, said weight including a flat inner side and curved outer side, said inner and outer sides cooperating to create lift upon air passing over said inner and outer sides.

5. The shuttle launch system of claim 1 wherein said shuttle glider support means comprises a shuttle lug tube having inner and outer ends, said shuttle lug tube extending through said peripheral sidewall intermediate said top end and said engine-receiving chamber, said inner end of said shuttle lug tube projecting within said inner chamber of said rocket, said outer end of said shuttle lug tube projecting outward from said side-wall of said rocket, and a pair of shuttle support struts mounted on said peripheral sidewall of said booster rocket and extending outward therefrom, each of said support struts including a securement hook operative to engage a portion of said wing of said shuttle glider, said shuttle lug tube and said shuttle support struts cooperating to provide a 3-point securement system for said shuttle glider.

6. The shuttle launch system of claim 5 wherein said fluid passage means comprises said shuttle lug tube, said inner end of said shuttle lug tube including a gas-receiving opening, said outer end of said shuttle lug tube including a gas-releasing opening, said gas-receiving opening operative to redirect a portion of compressed fluid within said inner chamber resulting from ignition from an ejection means of a model rocket engine through said shuttle lug tube and out of said gas-releasing opening.

7. The shuttle launch system of claim 1 wherein said shuttle glider support means comprises a shuttle-receiving depression formed in said booster rocket intermediate said top end and said engine receiving chamber, said shuttle-receiving depression being of a size and shape to accommodate the fuselage of said shuttle glider thereby releasably securing said shuttle glider within said shuttle-receiving depression and thus removably mounting said shuttle glider on said booster rocket.

8. The shuttle launch system of claim 7 wherein said fluid passage means comprises at least one gas-releasing hole extending between and connecting said shuttle-receiving depression and said inner chamber of said booster rocket, said gas-releasing holes operative to redirect a portion of fluid compressed within said inner chamber in response to ignition of an ejection means of a model rocket from said inner chamber through said holes into said shuttle-receiving depression thereby ejecting said shuttle glider from said shuttle-receiving depression.

9. The shuttle launch system of claim 8 wherein said shuttle glider support means further comprises a nose flap pivotally mounted on said peripheral side-wall of said booster rocket adjacent and overhanging said shuttle-receiving depression such that said nose flap releasably secures said shuttle glider within said shuttle-receiving depression.

10. A shuttle launch system for a model rocket including a model rocket engine having a propellant means for propelling said model rocket in a first direction and ejection means for ejecting matter in a second direction generally opposite said first direction, said system comprising in combination;

a booster rocket including a longitudinally extended tube having a peripheral sidewall, an inner chamber and top and bottom ends and an engine receiving chamber adjacent said bottom end of said tube;

a shuttle lug tube having inner and outer ends and extending through said peripheral sidewall intermediate said top end and said engine receiving chamber, said inner end of said shuttle lug tube projecting within said inner chamber of said rocket, said outer end of said shuttle lug tube projecting outward from said sidewall of said rocket;

said inner end of said shuttle lug tube including a gas-receiving opening, said outer end of said shuttle lug tube including a gas-releasing opening, said gas-receiving opening operative to redirect a portion of compressed fluid within said inner chamber resulting from ignition of an ejection means of a model rocket engine through said shuttle lug tube and out of said gas-releasing opening; and a shuttle glider including a fuselage and at least one wing;

said fuselage of said glider including a lug tube receiving socket for releasable receiving and securing of said lug tube therein such that said shuttle glider is releasable secured on said shuttle lug tube, thereby releasably securing said shuttle glider to said booster rocket; and said shuttle glider being ejected from said booster rocket upon ejection of matter from the ejection means of a model rocket engine held within said engine receiving chamber, said ejected matter compressing fluid within said inner chamber, said compressed fluid being redirected through said shuttle lug tube and outward from said gas-releasing opening impacting said lug tube receiving socket and propelling said shuttle glider outward from said booster rocket.

11. A shuttle launch system for a model rocket comprising;

a booster rocket including a longitudinally extended tube having a peripheral sidewall, an inner chamber and top and bottom ends and an engine receiving chamber within said inner chamber and adjacent said bottom end of said tube;

a model rocket engine having propellant means for ejecting matter in a first direction and ejection means for ejecting matter in a second direction generally opposite said first direction, said engine releasable secured within said engine receiving chamber;

a shuttle lug tube having inner and outer ends and extending through said peripheral sidewall intermediate said top end and said engine receiving chamber, said inner end of said shuttle lug tube projecting within said inner chamber of said rocket and including a gas-receiving opening facing said bottom end of said booster rocket, said outer end of said shuttle lug tube projecting outward from said sidewall of said rocket and including a gas-releasing opening, said gas-receiving opening operative to redirect a portion of matter ejected by said ejection means of said engine through said shuttle lug tube and out of said gas-releasing opening;

a shuttle glider including a fuselage and at least one wing;

a lug tube receiving socket in said fuselage for releasable receiving and securing said outer end of said lug tube such that said shuttle glider is releasable secured on said shuttle lug tube, thereby releasably securing said shuttle glider to said booster rocket; and said shuttle glider being separated from said booster rocket upon ejection of matter from said ejection means; said ejected matter compressing gas within said inner chamber, said gas moving within said inner chamber being redirected by said gas-receiving opening into said shuttle lug tube and outward through said gas-releasing opening impacting said lug tube receiving socket and propelling said shuttle glider outward from said booster rocket.

12. A method of launching a shuttle glider from a model rocket comprising;

providing a booster rocket including a longitudinally extended tube having a peripheral sidewall, an inner chamber, top and bottom ends and an engine receiving chamber within said inner chamber and adjacent said bottom end of said tube;

providing a model rocket engine having propellant means for ejecting matter in a first direction and ejection means for ejecting matter in a second direction generally opposite said first direction, said engine releasable secured within said engine receiving chamber;

providing shuttle glider support means mounted on said booster rocket for releasable supporting a shuttle glider thereon;

providing fluid passage means extending between said inner chamber of said booster rocket and said shuttle glider support means such that matter ejected from the ejection means of said model rocket engine compresses gas within said inner chamber, a portion of said compressed gas being redirected from said inner chamber through said fluid passage means and out of said shuttle glider support means;

providing a shuttle glider including a fuselage and at least one wing;

removably mounting said shuttle glider on said shuttle glider support means;

igniting said propellant means of said model rocket engine thereby launching said booster rocket and said shuttle glider;

said ejection means being ignited following flame-out of said propellant means thereby ejecting matter upwards through said inner chamber compressing gas within said chamber; and said shuttle glider being ejected from said booster rocket in response to matter being ejected from said ejection means thus compressing gas within said inner chamber, a portion of said compressed gas being redirected through said fluid passage means and out of said shuttle glider support means thereby forcing said shuttle glider apart from said booster rocket.

13. A method of launching a shuttle glider from a model rocket comprising;

providing a booster rocket including a longitudinally extended tube having a peripheral sidewall, an inner chamber, top and bottom ends and an engine receiving chamber within said inner chamber and adjacent said bottom end of said tube;

providing a model rocket engine having propellant means for ejecting matter in a first direction and ejection means for ejecting matter in a second direction generally opposite said first direction, said engine releasable secured within said engine receiving chamber;

providing a shuttle lug tube having inner and outer ends and extending through said peripheral sidewall intermediate said top end and said engine receiving chamber, said inner end of said shuttle lug tube projecting within said inner chamber of said rocket and including a gas-receiving opening facing said bottom end of said booster rocket, said outer end of said shuttle lug tube projecting outward from said sidewall of said rocket and including a gas-releasing opening, said gas-receiving opening operative to redirect gas through said shuttle lug tube and out of said gas-releasing opening;

providing a shuttle glider including a fuselage and at least one wing;

providing a lug tube receiving socket in said fuselage for releasable receiving and securing said outer end of said lug tube such that said shuttle glider is releasable secured on said shuttle lug tube, thereby releasable securing said shuttle glider to said booster rocket;

inserting said outer end of said shuttle lug tube into said lug tube receiving socket thereby releasable connecting said shuttle glider and said booster rocket;

igniting said propellant means of said model rocket engine thereby launching said booster rocket and said shuttle glider;

said ejection means being ignited upon said booster rocket reaching an altitude, thereby ejecting matter upwards through said inner chamber; and said shuttle glider being ejected from said booster rocket in response to matter being ejected from said ejection means thus compressing gas within said inner chamber, a portion of said compressed gas being redirected through said shuttle lug tube thus contacting said lug tube receiving socket and forcing said shuttle glider apart from said booster rocket.

* * * * *